United States Patent
Shigeta et al.

(10) Patent No.: US 10,265,989 B2
(45) Date of Patent: Apr. 23, 2019

(54) FUNCTIONAL CYLINDER BODY AND MANUFACTURING METHOD THEREFOR

(71) Applicant: THINK LABORATORY CO., LTD., Chiba (JP)

(72) Inventors: Tatsuo Shigeta, Chiba (JP); Kaku Shigeta, Chiba (JP); Shintaro Sugawara, Chiba (JP)

(73) Assignee: THINK LABORATORY CO. LTD, Chiba (JP)

( * ) Notice: Subject to any disclaimer, the term of this patent is extended or adjusted under 35 U.S.C. 154(b) by 0 days.

(21) Appl. No.: 15/562,678

(22) PCT Filed: Mar. 29, 2016

(86) PCT No.: PCT/JP2016/060137
§ 371 (c)(1),
(2) Date: Sep. 28, 2017

(87) PCT Pub. No.: WO2016/170935
PCT Pub. Date: Oct. 27, 2016

(65) Prior Publication Data
US 2018/0086127 A1 Mar. 29, 2018

(30) Foreign Application Priority Data
Apr. 21, 2015 (JP) .................................. 2015-086401

(51) Int. Cl.
*B41C 1/00* (2006.01)
*B41C 1/05* (2006.01)
(Continued)

(52) U.S. Cl.
CPC ................... *B41N 1/16* (2013.01); *B41C 1/00* (2013.01); *B41C 1/18* (2013.01); *B41C 1/188* (2013.01);
(Continued)

(58) Field of Classification Search
CPC ... B41N 1/16; B41N 1/20; B41N 7/00; B41N 7/06; B41C 1/02; B41C 1/1058; B41F 27/02
(Continued)

(56) References Cited

U.S. PATENT DOCUMENTS 3,721,189 A * 3/1973 Bray ........................ B41F 27/02
101/389.1
3,734,017 A * 5/1973 Trier ........................ B41F 27/02
101/378
(Continued)

FOREIGN PATENT DOCUMENTS

CN 203803737 U 9/2014
EP 3 282 133 A1 2/2018
(Continued)

*Primary Examiner* — Jason L Vaughan
(74) *Attorney, Agent, or Firm* — McGlew and Tuttle, P.C.

(57) ABSTRACT

Provided are a functional cylinder body, including a plurality of layers having magnetic patterns and non-magnetic patterns formed adjacently, and a manufacturing method therefor. The functional cylinder body comprises at least: a cylinder main body; a first functional pattern part, which includes first patterns and first functional patterns, the first patterns having first recess patterns and first non-recess patterns formed by forming recesses on a first material layer made of any one of a magnetic material and a non-magnetic material, the first functional patterns being made of any one of the magnetic material and the non-magnetic material embedded in the first recess patterns; and a second functional pattern part, which is formed in a position of the cylinder main body shallower than a position of the first recess patterns and has magnetic patterns of the magnetic material and non-magnetic patterns of the non-magnetic material formed adjacently.

20 Claims, 4 Drawing Sheets

(51) Int. Cl.
  *B41C 1/18* (2006.01)
  *B41F 9/06* (2006.01)
  *B41N 1/06* (2006.01)
  *B41N 1/16* (2006.01)
  *B41F 13/11* (2006.01)
  *F15B 15/14* (2006.01)
  *F15B 15/28* (2006.01)
  *F16J 10/00* (2006.01)

(52) U.S. Cl.
  CPC ............... *B41F 9/06* (2013.01); *B41F 13/11* (2013.01); *B41N 1/06* (2013.01); *F15B 15/14* (2013.01); *F16J 10/00* (2013.01); *B41C 1/05* (2013.01); *F15B 15/1428* (2013.01); *F15B 15/2846* (2013.01); *F15B 15/2861* (2013.01)

(58) Field of Classification Search
  USPC ..................................... 492/8, 28, 30, 31, 58
  See application file for complete search history.

(56) References Cited

U.S. PATENT DOCUMENTS

| | | | | |
|---|---|---|---|---|
| 3,742,852 A * | 7/1973 | Leffler | ............... | B41F 27/02 101/378 |
| 5,627,505 A * | 5/1997 | Iwaszek | ............... | B41F 27/02 101/389.1 |
| 5,797,323 A * | 8/1998 | Beck | ............... | B41L 29/02 101/378 |
| 5,898,352 A * | 4/1999 | McEachern | ............... | H01F 7/0268 335/302 |
| 5,938,579 A * | 8/1999 | Cavazos | ............... | B03C 1/12 492/36 |
| 6,062,140 A * | 5/2000 | McEachern | ............... | B41F 27/02 101/389.1 |
| 6,397,747 B1 * | 6/2002 | McEachern | ............. | B41F 27/02 101/378 |
| 6,454,686 B1 * | 9/2002 | McEachern | ............ | B26D 7/2614 335/302 |
| 7,503,367 B2 * | 3/2009 | Uyttenboogaart | ... | B29D 30/242 156/414 |
| 2005/0155505 A1 * | 7/2005 | Jeurink | ............... | B41F 27/02 101/375 |
| 2007/0172261 A1 | 7/2007 | Raksha et al. | | |
| 2007/0227379 A1 * | 10/2007 | Sato | ............... | B41F 27/02 101/389.1 |
| 2007/0231091 A1 * | 10/2007 | Ohsawa | ............... | B41F 27/02 408/69 |
| 2007/0231093 A1 * | 10/2007 | Ohsawa | ............... | B41F 27/02 408/199 |
| 2011/0168088 A1 | 7/2011 | Raksha et al. | | |
| 2011/0227590 A1 | 9/2011 | Killian | | |
| 2014/0053747 A1 * | 2/2014 | Pantchev | ............... | B41F 27/12 101/378 |
| 2014/0060354 A1 * | 3/2014 | Pantchev | ............... | B41F 13/24 101/248 |

FOREIGN PATENT DOCUMENTS

| | | |
|---|---|---|
| JP | Hei 05-1063 U | 1/1993 |
| JP | H09-216335 A | 8/1997 |
| JP | 2002-240235 A | 8/2002 |
| JP | 3088245 U | 9/2002 |
| JP | 2003-94710 A | 4/2003 |
| JP | 2004-223751 A | 8/2004 |
| JP | 2006-56085 A | 3/2006 |
| JP | 2007-130996 A | 5/2007 |
| WO | 2007/135898 A1 | 11/2007 |
| WO | 2011/125926 A1 | 10/2011 |

* cited by examiner

FIG.3
(a)
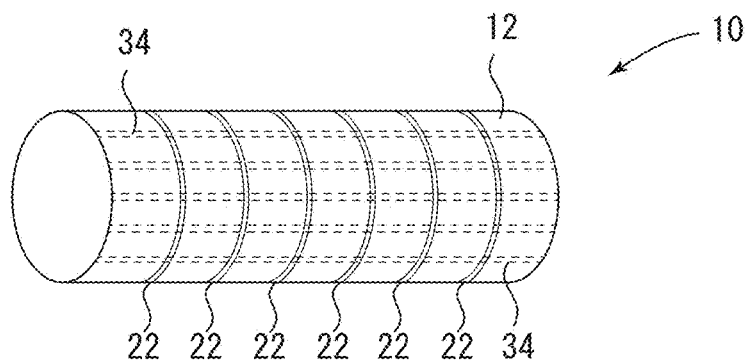
(b)
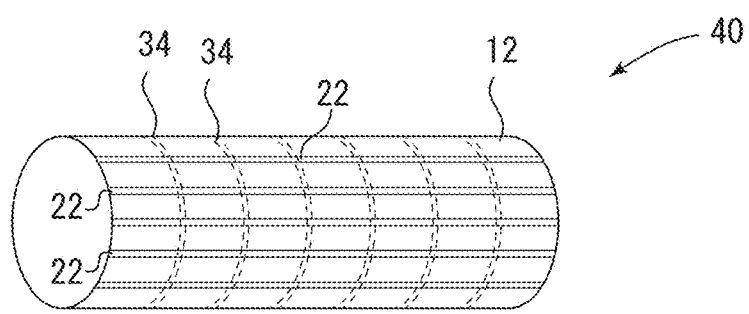
FIG.4
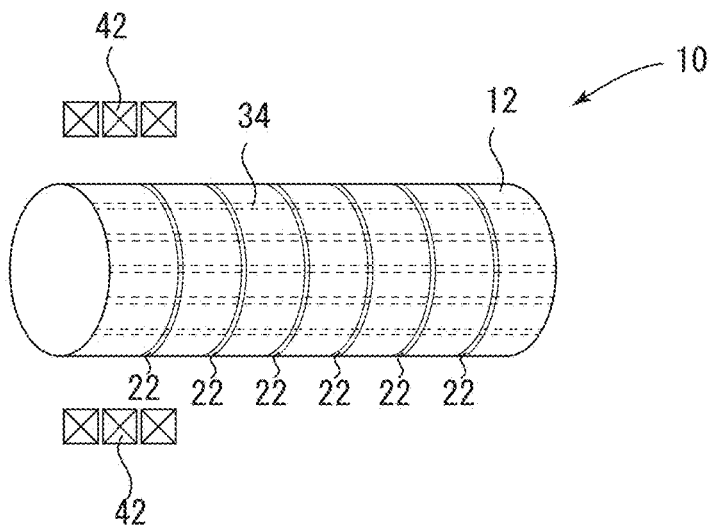

FUNCTIONAL CYLINDER BODY AND MANUFACTURING METHOD THEREFOR

TECHNICAL FIELD

The present invention relates to a functional cylinder body, including a plurality of layers having magnetic patterns of a magnetic material and non-magnetic patterns of a non-magnetic material formed adjacently, and a manufacturing method therefor.

BACKGROUND ART

A gravure plate-making roll has hitherto been known as a cylinder body with recesses. A general manufacturing process of the gravure plate-making roll is described in, for example, the related-art section of Patent Document 1. Specifically, the manufacturing process is a process involving: installation—chromium peeling—correction polishing and plate falling polishing—degreasing—water washing—acid washing—water washing—copper sulfate plating—grinding stone polishing—photosensitive film application formation—image printing with a laser exposure device—development—etching—resist peeling—chromium plating—paper polishing—delivery.

Further, a gravure plate-making roll using a DLC as a surface reinforcing coating layer has also been known from, for example, Patent Document 2.

Further, as a fully automatic manufacturing system of a gravure plate-making roll, there are given systems described in, for example, Patent Documents 3 and 4.

Meanwhile, as cylinders used in various devices, a hydraulic cylinder and a pneumatic cylinder have been known (Patent Documents 5 and 6).

PRIOR ART DOCUMENTS

Patent Documents

Patent Document 1: JP 2004-223751 A
Patent Document 2: JP 2007-130996 A
Patent Document 3: WO 2007/135898 A1
Patent Document 4: WO 2011/125926 A1
Patent Document 5: JP 3088245 U
Patent Document 6: JP Hei 05-1063 U

SUMMARY OF THE INVENTION

Problems to be Solved by the Invention

The applicant of the present application has found that a novel functional cylinder body can be obtained by embedding a magnetic material or a non-magnetic material in recesses of a cylinder body with recesses, to thereby achieve the present invention.

That is, an object of the present invention is to provide a functional cylinder body, including a plurality of layers having magnetic patterns and non-magnetic patterns formed adjacently, and a manufacturing method therefor.

Means for Solving Problems

In order to achieve the above-mentioned object, according to one embodiment of the present invention, there is provided a functional cylinder body, including at least: a cylinder main body; a first functional pattern part including first patterns and first functional patterns, the first patterns having first recess patterns and first non-recess patterns formed by forming recesses on a first material layer made of any one of a magnetic material and a non-magnetic material of the cylinder main body, the first functional patterns being made of any one of the magnetic material and the non-magnetic material embedded in the first recess patterns, magnetic patterns of the magnetic material and non-magnetic patterns of the non-magnetic material being adjacently formed by embedding the non-magnetic material in the first recess patterns when the first material layer is made of the magnetic material and by embedding the magnetic material in the first recess patterns when the first material layer is made of the non-magnetic material; and a second functional pattern part including second patterns and second functional patterns, the second patterns being formed in a position of the cylinder main body shallower than a position of the first recess patterns and having second recess patterns and second non-recess patterns formed by forming recesses on a second material layer made of any one of the magnetic material and the non-magnetic material of the cylinder main body, the second functional patterns being made of any one of the magnetic material and the non-magnetic material embedded in the second recess patterns, magnetic patterns of the magnetic material and non-magnetic patterns of the non-magnetic material being adjacently formed by embedding the non-magnetic material in the second recess patterns when the second material layer is made of the magnetic material and by embedding the magnetic material in the second recess patterns when the second material layer is made of the non-magnetic material.

The functional cylinder body of the present invention has a plurality of stages of a first functional pattern part and a second functional pattern part. However, it is only necessary that the functional cylinder body of the present invention comprises at least the first functional pattern part and the second functional pattern part. Therefore, the functional cylinder body of the present invention may have a multi-stage structure further including a third functional pattern part and a fourth functional pattern part.

Further, for convenience, the material layers are referred to as the first material layer and the second material layer. However, the first material layer and the second material layer may be made of the same material. Further, both the first functional patterns and the second functional patterns may be made of the magnetic material or the non-magnetic material.

It is preferred that the first functional patterns and/or the second functional patterns are formed in a linear shape and formed alternately in a radial direction and/or an axial direction of the cylinder main body.

It is preferred that the first functional patterns and the second functional patterns are formed in a linear shape and formed so as to be orthogonal to each other.

It is preferred that the recesses of the cylinder main body are manufactured by laser plate making. As the laser plate making technology, for example, technologies disclosed in Patent Documents 1 to 4 are applicable.

It is preferred that the magnetic patterns are made of at least one kind of magnetic material selected from the group consisting of Fe, Ni, and Co. The magnetic patterns may be made of an alloy using the magnetic materials.

It is preferred that the non-magnetic patterns are made of at least one kind of non-magnetic material selected from the group consisting of Cu and Al. The non-magnetic patterns may be made of an alloy using the non-magnetic materials.

It is preferred that the magnetic patterns and the non-magnetic patterns are made of a metal material and formed by metal plating.

It is preferred that the recesses of the cylinder main body have an opening width of from 1 µm to 1,000 µm. Further, the opening width is more preferably from 1 µm to 50 µm, still more preferably from 1 µm to 20 µm.

It is preferred that the recesses of the cylinder main body have a depth of from 1 µm to 1,000 µm. Further, the depth is more preferably from 1 µm to 50 µm, still more preferably from 1 µm to 20 µm.

An apparatus according to the present invention comprises the said functional cylinder body. The apparatus of the present invention encompasses any apparatus capable of including the functional cylinder body of the present invention, for example, a hydraulic cylinder or an air cylinder including the functional cylinder body of the present invention, a machine tool including the hydraulic cylinder or the air cylinder, a robot, a linear sensor, micro electro mechanical systems (MEMS), an aircraft, a satellite, and the like.

It is preferred that the apparatus further comprises magnetic flux detection means arranged in a vicinity of an outer circumferential surface of the functional cylinder body. As the magnetic flux detection means, there is given, for example, a coil formed into an annular shape.

A method of manufacturing a functional cylinder body according to the present invention is a method of manufacturing a functional cylinder body for manufacturing the above-mentioned functional cylinder body, the method comprising: a step of preparing a cylinder main body having a first material layer made of any one of a magnetic material and a non-magnetic material formed on a circumferential surface; a first pattern forming step of forming first patterns having first recess patterns and first non-recess patterns, the first pattern forming step including a step of applying a resist onto a surface of the first material layer and a step of subjecting the resist to laser exposure; a first functional pattern part forming step of adjacently forming magnetic patterns of the magnetic material and non-magnetic patterns of the non-magnetic material by embedding first functional patterns made of any one of the magnetic material and the non-magnetic material in recesses of the first patterns; a step of forming a second material layer made of any one of the magnetic material and the non-magnetic material on a circumferential surface of the cylinder main body having the first functional patterns formed thereon; a second pattern forming step of forming second patterns having second recess patterns and second non-recess patterns, the second pattern forming step including a step of applying a resist onto a surface of the second material layer and a step of subjecting the resist to laser exposure; and a second functional pattern part forming step of adjacently forming magnetic patterns of the magnetic material and non-magnetic patterns of the non-magnetic material by embedding second functional patterns made of any one of the magnetic material and the non-magnetic material in recesses of the second patterns.

It is preferred that the first functional patterns and/or the second functional patterns are formed in a linear shape and formed alternately in a radial direction and/or an axial direction of the cylinder main body.

It is preferred that the first functional patterns and the second functional patterns are formed in a linear shape and formed so as to be orthogonal to each other.

It is preferred that the recesses of the cylinder main body are manufactured by laser plate making. As the laser plate making technology, for example, technologies disclosed in Patent Documents 1 to 4 are applicable.

It is preferred that the magnetic patterns are made of at least one kind of magnetic material selected from the group consisting of Fe, Ni, and Co. The magnetic patterns may be made of an alloy using the magnetic materials.

It is preferred that the non-magnetic patterns are made of at least one kind of non-magnetic material selected from the group consisting of Cu and Al. The non-magnetic patterns may be made of an alloy using the non-magnetic materials.

It is preferred that the magnetic patterns and the non-magnetic patterns are made of a metal material, and that the method further include a metal plating step of forming the magnetic patterns and the non-magnetic patterns.

It is preferred that the method of manufacturing a functional cylinder body of the present invention is performed by a fully automatic laser gravure plate-making system. As the fully automatic laser gravure plate-making system, for example, systems disclosed in Patent Documents 3 and 4 are applicable. In particular, the system, in which a plurality of non-travelling industrial robots are installed, and the industrial robots are caused to transfer a plate base material to each other to successively transport the plate base material to a processing unit, to thereby manufacture and process a cylinder body with recesses, as disclosed in Patent Document 4 is suitable from the viewpoint of production efficiency and prevention of dust generation.

Advantageous Effects of the Invention

According to the present invention, the present invention exhibits the remarkable effect capable of providing the functional cylinder body, including a plurality of layers having magnetic patterns and non-magnetic patterns formed adjacently, and the manufacturing method therefor.

BRIEF DESCRIPTION OF DRAWINGS

FIG. 2(a) is a schematic main portion sectional view for illustrating a first pattern forming step. FIG. 2(b) is a schematic main portion sectional view for illustrating a first functional pattern part forming step. FIG. 2(c) is a schematic main portion sectional view for illustrating a step of forming a second material layer. FIG. 2(d) is a schematic main portion sectional view for illustrating a second pattern forming step. FIG. 2(e) is a schematic main portion sectional view for illustrating a second functional pattern part forming step. FIG. 2(f) is a schematic main portion sectional view for illustrating a surface hardening coating film forming step.

FIG. 3 is a schematic view for illustrating the functional cylinder body of the present invention. FIG. 3(a) is a schematic view in which first functional patterns are formed in a linear shape in a radial direction of a cylinder main body, and second functional patterns are formed in an axial direction of the cylinder main body. FIG. 3(b) is a schematic view in which the second functional patterns are formed in a linear shape in the radial direction of the cylinder main body, and the first functional patterns are formed in the axial direction of the cylinder main body.

FIG. 4 is a schematic view of an apparatus in which magnetic flux detection means is arranged in the vicinity of an outer circumferential surface of the functional cylinder body of the present invention.

MODES FOR CARRYING OUT THE INVENTION

Embodiments of the present invention are described below, but those embodiments are described as examples, and hence it is understood that various modifications may be made thereto without departing from the technical spirit of the present invention. In addition, the same members are represented by the same reference symbols.

Figure 1:
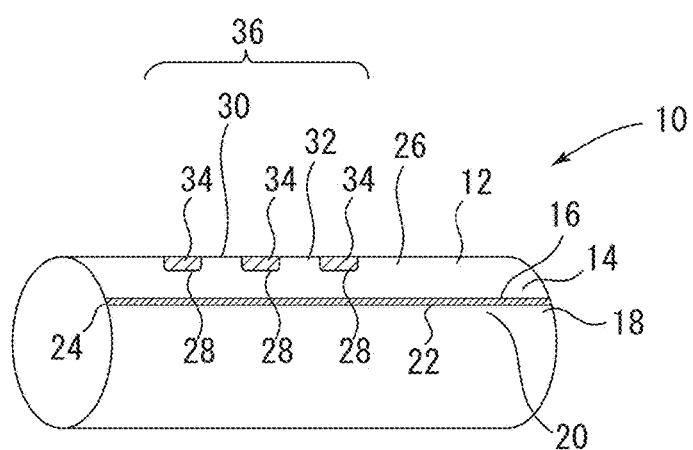
FIG. 1 is a schematic partial sectional view for illustrating a functional cylinder body according to one embodiment of the present invention.

In FIG. 1, reference symbol 10 denotes one embodiment of a functional cylinder body according to the present invention.

A functional cylinder body 10 is a functional cylinder body, including at least: a cylinder main body 12; a first functional pattern part 24 including first patterns 20 and first functional patterns 22, the first patterns 20 having first recess patterns 16 and first non-recess patterns 18 formed by forming recesses on a first material layer 14 made of any one of a magnetic material and a non-magnetic material of the cylinder main body 12, the first functional patterns 22 being made of any one of the magnetic material and the non-magnetic material embedded in the first recess patterns 16, magnetic patterns of the magnetic material and non-magnetic patterns of the non-magnetic material being adjacently formed by embedding the non-magnetic material in the first recess patterns 16 when the first material layer 14 is made of the magnetic material and by embedding the magnetic material in the first recess patterns 16 when the first material layer 14 is made of the non-magnetic material; and a second functional pattern part 36 including second patterns 32 and second functional patterns 34, the second patterns 32 being formed in a position of the cylinder main body 12 shallower than a position of the first recess patterns 16 and having second recess patterns 28 and second non-recess patterns 30 formed by forming recesses on a second material layer 26 made of any one of the magnetic material and the non-magnetic material of the cylinder main body 12, the second functional patterns 34 being made of any one of the magnetic material and the non-magnetic material embedded in the second recess patterns 28, magnetic patterns of the magnetic material and non-magnetic patterns of the non-magnetic material being adjacently formed by embedding the non-magnetic material in the second recess patterns 28 when the second material layer 26 is made of the magnetic material and by embedding the magnetic material in the second recess patterns 28 when the second material layer 26 is made of the non-magnetic material.

Figure 2:
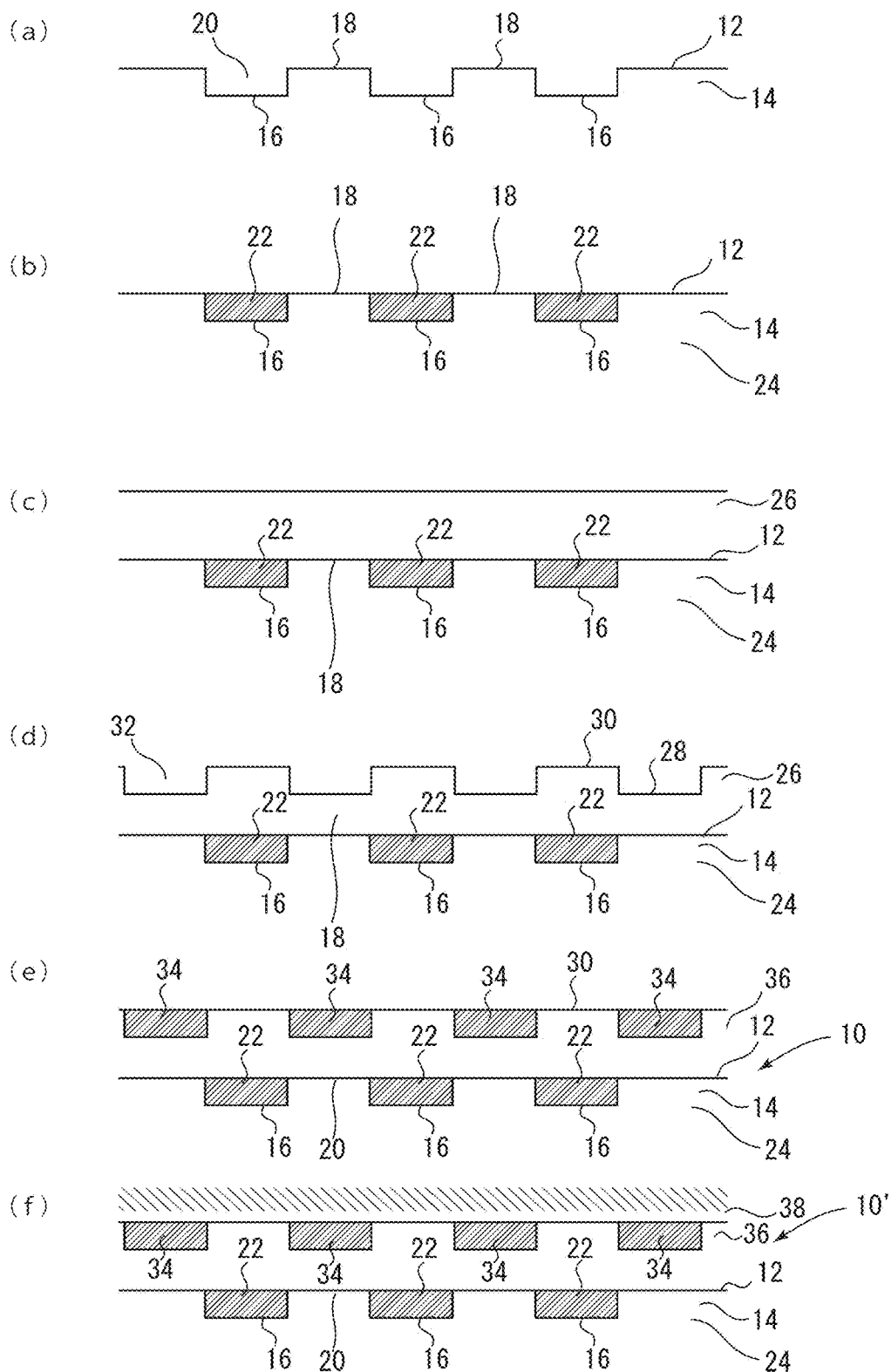
FIG. 2 is an explanatory view for schematically illustrating a method of manufacturing a functional cylinder body of the present invention.

In manufacturing of the functional cylinder body 10, as is well illustrated in FIG. 2, the cylinder main body 12 having the first material layer 14 made of any one of the magnetic material and the non-magnetic material formed on a circumferential surface is prepared.

Next, a resist is applied onto a surface of the first material layer 14 of the cylinder main body 12, and the resist is subjected to laser exposure. Further, etching (corrosion) is performed to form recesses, to thereby form the first patterns 20 in which the first recess patterns 16 and the first non-recess patterns 18 are formed (FIG. 2(a)). As a method of forming the recesses on the surface of the first material layer 14 of the cylinder main body 12, for example, methods disclosed in Patent Documents 1 to 4 may be adopted.

Next, the first functional patterns 22 made of any one of the magnetic material and the non-magnetic material are embedded in the formed recesses of the first patterns 20, to thereby form the first functional pattern part 24 so that magnetic patterns of the magnetic material and the non-magnetic patterns of the non-magnetic material are adjacently arranged (FIG. 2(b)).

Then, the second material layer 26 made of any one of the magnetic material and the non-magnetic material is formed on a circumferential surface of the cylinder main body 12 having the first functional patterns 22 formed thereon (FIG. 2(c)).

Next, a resist is applied onto a surface of the second material layer 26 of the cylinder main body 12, and the resist is subjected to laser exposure. Further, etching (corrosion) is performed to form recesses, to thereby form the second patterns 32 in which the second recess patterns 28 and the second non-recess patterns 30 are formed (FIG. 2(d)). As a method of forming the recesses on the surface of the second material layer 26 of the cylinder main body 12, for example, methods disclosed in Patent Documents 1 to 4 may be adopted in the same manner as described above.

Next, the second functional patterns 34 made of any one of the magnetic material and the non-magnetic material are embedded in the formed recesses of the second patterns 32, to thereby form the second functional pattern part 36 so that the magnetic patterns of the magnetic material and the non-magnetic patterns of the non-magnetic material are adjacently arranged (FIG. 2(e)).

Thus, the functional cylinder body 10 of the present invention is completed.

In the example of FIG. 2, for example, when the first material layer 14 of the cylinder main body 12 is made of a non-magnetic material, for example, copper, the resist is applied onto the surface of the first material layer 14 of the cylinder main body 12, the resist is subjected to laser exposure, and further the copper is subjected to etching, with the result that the first recess patterns 16 are formed. When the first functional patterns 22 made of a magnetic material, for example, nickel, are embedded in the first recess patterns 16, the magnetic patterns embedded in the recesses and the non-recess patterns 18 made of the non-magnetic material are adjacently arranged. In the present invention, the functional patterns embedded in the first recess patterns 16 encompass both the patterns made of the magnetic material and the patterns made of the non-magnetic material.

Similarly, for example, when the second material layer 26 of the cylinder main body 12 is made of a non-magnetic material, for example, copper, a resist is applied onto a surface of the second material layer 26 of the cylinder main body 12, and the resist is subjected to laser exposure, followed by etching of copper, to form the second recess patterns 28. Then, the second functional patterns 34 made of a magnetic material, for example, nickel, are embedded in the second recess patterns 28, with the result that the magnetic patterns embedded in the recesses and the non-recess patterns made of the non-magnetic material are adjacently arranged. In the present invention, the functional patterns embedded in the second recess patterns 28 encompass both the patterns made of the magnetic material and the patterns made of the non-magnetic material.

When further strength is required, a surface hardening coating film 38 may be formed through use of a known surface hardening coating film material, for example, chromium or DLC, on the surface of the functional cylinder body 10, to thereby form a functional cylinder body 10' as illustrated in FIG. 2(f).

In the illustrated example, a solid roll is used as an example of the cylinder main body 12, but a hollow roll may be used. There is no particular limitation on the material for the cylinder main body 12, but it is required that the circumferential surface thereof is made of any one of a magnetic material or a non-magnetic material.

In FIG. 1, there is illustrated an example in which the first functional patterns 22 are formed in a linear shape in a radial direction of the cylinder main body 12, and the second functional patterns 34 are formed in an axial direction of the cylinder main body 12 as illustrated in FIG. 3(*a*).

As illustrated in FIG. 3(*b*), a functional cylinder body 40, in which the second functional patterns 34 are formed in a linear shape in a radial direction of the cylinder main body 12, and the first functional patterns 22 are formed in an axial direction of the cylinder main body 12, may also be formed.

Next, a schematic view of an apparatus in which magnetic flux detection means 42 is arranged in the vicinity of the outer circumferential surface of the functional cylinder body 10 of the present invention is illustrated in FIG. 4. In FIG. 4, an example using a magnetic flux detection coil as the magnetic flux detection means 42 is illustrated. With this, when the functional cylinder body 10 of the present invention is used in, for example, a piston rod of a hydraulic cylinder or an air cylinder, the position of the piston rod can be accurately detected, and hence the accurate position detection and control can be performed. Further, the functional patterns may be produced with various widths of, for example, from about 1 μm to about 1,000 μm, and hence the apparatus is also applicable to a fine product such as MEMS.

EXAMPLES

Now, the present invention is more specifically described by way of Examples, but it is needless to say that Examples are only illustrative and should not be interpreted as limiting the present invention.

Example 1

A hollow roll made of aluminum having a circumference of 600 mm, a surface length of 1,100 mm, and a thickness of 10 mm was prepared as a cylinder main body, and a functional cylinder body was manufactured through use of NewFX (fully automatic laser plate-making system manufactured by Think Laboratory Co., Ltd.). First, the hollow roll serving as a roll to be processed was mounted onto a copper plating bath and completely immersed in a plating solution, to thereby form a copper-plated layer of 80 μm at 30 A/dm$^2$ and 6.0 V. No nodules and pits were generated on the plated surface, and a uniform copper-plated layer serving as a first material layer was obtained. The surface of the copper-plated layer was polished through use of a two-head polishing machine (polishing machine manufactured by Think Laboratory Co., Ltd.), to thereby form a uniform polished surface as the surface of the copper-plated layer.

Next, a photosensitive film (thermal resist: TSER2104 E4 (manufactured by Think Laboratory Co., Ltd.)) was applied (with a fountain coater) onto the surface of the formed copper-plated layer and dried. The thickness of the obtained photosensitive film was measured with a thickness meter (F20 manufactured by Filmetrics, Inc. and sold by Matsushita Techno Trading Co, Ltd.) to be 4 μm. The n, an image was developed by laser exposure. The laser exposure was performed with a predetermined pattern under an exposure condition of 500 mJ/cm$^2$ through use of Laser Stream FX. Further, the development was performed through use of a TLD developing solution (developing solution manufactured by Think Laboratory Co., Ltd.) with a developing solution dilution ratio (undiluted solution:water=1:7) at 24° C. for 90 seconds, to thereby form a predetermined resist pattern. Then, the copper-plated layer was corroded through use of the resist pattern thus formed as an etching mask. The corrosion was performed by spraying a copper(II) chloride solution serving as a corrosive liquid onto the copper-plated layer at 35° C. for 20 seconds. Then, the resist of the resist pattern was peeled through use of sodium hydroxide with a dilution ratio of 20 g/L at 40° C. for 180 seconds.

The recesses were formed on the surface of the first material layer in a linear shape in an axial direction as described above, and thus a cylinder body with recesses in which first recess patterns and first non-recess patterns were formed was obtained. The opening width of the recess was 20 μm, and the depth thereof was 4 μm.

The cylinder body with recesses thus obtained was mounted onto a nickel plating bath and completely immersed in a plating solution, to thereby subject the recess patterns to nickel plating of 20 μm at 2 A/dm$^2$ and 6.0 V to embed functional patterns in the recesses. The surfaces of the non-recess patterns were also subjected to nickel plating but were polished through use of a two-head polishing machine (polishing machine manufactured by Think Laboratory Co., Ltd.), to thereby expose the surfaces of the non-recess patterns.

The hollow roll in which the surfaces of the non-recess patterns are exposed was mounted onto a copper plating bath and completely immersed in a plating solution, to thereby form a copper-plated layer of 20 μm at 30 A/dm$^2$ and 6.0 V. No nodules and pits were generated on the plated surface, and a uniform copper-plated layer serving as a second material layer was obtained. The surface of the copper-plated layer was polished through use of a two-head polishing machine (polishing machine manufactured by Think Laboratory Co., Ltd.), to thereby form a uniform polished surface as the surface of the copper-plated layer.

Next, a photosensitive film (thermal resist: TSER2104 E4 (manufactured by Think Laboratory Co., Ltd.)) was applied (with a fountain coater) onto the surface of the formed copper-plated layer and dried. The thickness of the obtained photosensitive film was measured with a thickness meter (F20 manufactured by Filmetrics, Inc. and sold by Matsushita Techno Trading Co, Ltd.) to be 4 μm. The n, an image was developed by laser exposure. The laser exposure was performed with a predetermined pattern under an exposure condition of 500 mJ/cm$^2$ through use of Laser Stream FX. Further, the development was performed through use of a TLD developing solution (developing solution manufactured by Think Laboratory Co., Ltd.) with a developing solution dilution ratio (undiluted solution:water=1:7) at 24° C. for 90 seconds, to thereby form a predetermined resist pattern. Then, the copper-plated layer was corroded through use of the resist pattern thus formed as an etching mask. The corrosion was performed by spraying a copper(II) chloride solution serving as a corrosive liquid onto the copper-plated layer at 35° C. for 40 seconds. Then, the resist of the resist pattern was peeled through use of sodium hydroxide with a dilution ratio of 20 g/L at 40° C. for 180 seconds.

The recesses were formed on the surface of the second material layer in a linear shape in a radial direction as described above, and thus a cylinder body with recesses in which second recess patterns and second non-recess patterns were formed was obtained. The opening width of the recess was 20 μm, and the depth thereof was 8 μm.

Figure 5:
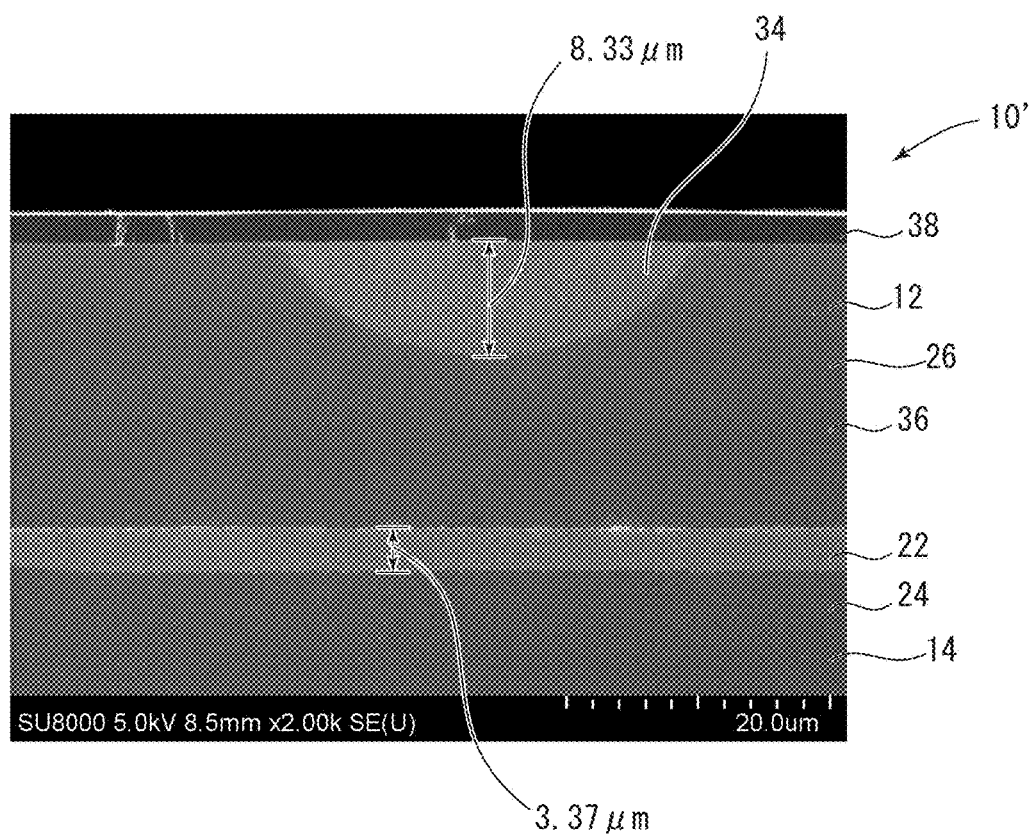
FIG. 5 is a magnified photograph of an axial cross-section of a functional cylinder body manufactured in Example 1.

The cylinder body with recesses thus obtained was mounted onto a nickel plating bath and completely immersed in a plating solution, to thereby subject the recess patterns to nickel plating of 20 μm at 2 A/dm² and 6.0 V to embed functional patterns in the recesses. The surfaces of the non-recess patterns were also subjected to nickel plating but were polished through use of a two-head polishing machine (polishing machine manufactured by Think Laboratory Co., Ltd.), to thereby expose the surfaces of the non-recess patterns. Further, the resultant was subjected to chromium plating of 5 μm, to thereby provide a functional cylinder body. A magnified photograph of an axial cross-section of the obtained functional cylinder body is shown in FIG. 5.

REFERENCE SIGNS LIST 10, 10', 40: functional cylinder body, 12: cylinder main body, 14: first material layer, 16: first recess pattern, 18: first non-recess pattern, 20: first pattern, 22: first functional pattern, 24: first functional pattern part, 26: second material layer, 28: second recess pattern, 30: second non-recess pattern, 32: second pattern, 34: second functional pattern, 36: second functional pattern part, 38: surface hardening coating film, 42: magnetic flux detection means.

The invention claimed is:

1. A functional cylinder body, comprising at least:
a cylinder main body;
a first functional pattern part comprising first patterns, and first functional patterns, the first patterns having first recess patterns and first non-recess patterns formed by forming recesses on a first material layer made of any one of a magnetic material and a non-magnetic material of the cylinder main body, the first functional patterns being made of any one of the magnetic material and the non-magnetic material embedded in the first recess patterns, magnetic patterns of the magnetic material and non-magnetic patterns of the non-magnetic material being adjacently formed by embedding the non-magnetic material in the first recess patterns when the first material layer is made of the magnetic material and by embedding the magnetic material in the first recess patterns when the first material layer is made of the non-magnetic material; and
a second functional pattern part comprising second patterns, and second functional patterns, the second patterns being formed in a position of the cylinder main body shallower than a position of the first recess patterns and the second patterns having second recess patterns and second non-recess patterns formed by forming recesses on a second material layer made of any one of the magnetic material and the non-magnetic material of the cylinder main body, the second functional patterns being made of any one of the magnetic material and the non-magnetic material embedded in the second recess patterns, magnetic patterns of the magnetic material and non-magnetic patterns of the non-magnetic material being adjacently formed by embedding the non-magnetic material in the second recess patterns when the second material layer is made of the magnetic material and by embedding the magnetic material in the second recess patterns when the second material layer is made of the non-magnetic material.

2. A functional cylinder body according to claim 1, wherein at least one of the first functional patterns and the second functional patterns are formed in a linear shape and formed alternately in one or more of a radial direction and an axial direction of the cylinder main body.

3. A functional cylinder body according to claim 1, wherein the first functional patterns and the second functional patterns are formed in a linear shape and formed so as to be orthogonal to each other.

4. A functional cylinder body according to claim 1, wherein the recesses of the cylinder main body are manufactured by laser plate making.

5. A functional cylinder body according to claim 1, wherein the magnetic patterns are made of at least one kind of magnetic material, the at least one kind of magnetic material comprising one of Fe, Ni, and Co.

6. A functional cylinder body according to claim 1, wherein the non-magnetic patterns are made of at least one kind of non-magnetic material comprising one of Cu and Al.

7. A functional cylinder body according to claim 1, wherein the magnetic patterns and the non-magnetic patterns are made of a metal material and formed by metal plating.

8. A functional cylinder body according to claim 1, wherein the recesses of the cylinder main body have an opening width of from 1 μm to 1,000 μm.

9. A functional cylinder body according to claim 1, wherein the recesses of the cylinder main body have a depth of from 1 μm to 1,000 μm.

10. A functional cylinder body according to claim 1, wherein the second material layer comprises a second material layer outer surface, the second material layer outer surface comprising a second material magnetic material outer surface portion and a second material non-magnetic outer surface portion, the second material magnetic material outer surface portion and the second material non-magnetic outer surface portion extending in a circumferential direction of the second material layer relative to a longitudinal axis of the second material layer, the second material magnetic material outer surface portion being located axially adjacent to the second material non-magnetic outer surface portion relative to the longitudinal axis of the second material layer.

11. An apparatus, comprising:
a functional cylinder body comprising a cylinder main body, a first functional pattern part and a second functional pattern part, the first functional pattern part comprising first patterns, and first functional patterns, the first patterns having first recess patterns and first non-recess patterns formed by forming recesses on a first material layer made of any one of a magnetic material and a non-magnetic material of the cylinder main body, the first functional patterns being made of any one of the magnetic material and the non-magnetic material embedded in the first recess patterns, magnetic patterns of the magnetic material and non-magnetic patterns of the non-magnetic material being adjacently formed by embedding the non-magnetic material in the first recess patterns when the first material layer is made of the magnetic material and by embedding the magnetic material in the first recess patterns when the first material layer is made of the non-magnetic material, the second functional pattern part comprising second patterns, and second functional patterns, the second patterns being formed in a position of the cylinder main body shallower than a position of the first recess patterns and the second patterns having second recess patterns and second non-recess patterns formed by forming recesses on a second material layer made of any one of the magnetic material and the non-magnetic material of the cylinder main body, the second functional patterns being made of any one of the magnetic material and the non-magnetic material embedded in the second recess patterns, magnetic patterns of the magnetic material and non-magnetic patterns of the non-magnetic material being adjacently formed by embedding the non-magnetic material in the second recess patterns when the second material layer is made of the magnetic material and by embedding the magnetic material in the second recess patterns when the second material layer is made of the non-magnetic material.

12. An apparatus according to claim 11, further comprising a magnetic flux detection means arranged in a vicinity of an outer circumferential surface of the functional cylinder body.

13. A method of manufacturing a functional cylinder body for manufacturing the functional cylinder body of claim 1, the method comprising:
preparing a cylinder main body having a first material layer made of any one of a magnetic material and a non-magnetic material formed on a circumferential surface;
a first pattern forming step of forming first patterns having first recess patterns and first non-recess patterns, the first pattern forming step including applying a resist onto a surface of the first material layer and subjecting the resist to laser exposure;
a first functional pattern part forming step of adjacently forming magnetic patterns of the magnetic material and non-magnetic patterns of the non-magnetic material by embedding first functional patterns made of any one of the magnetic material and the non-magnetic material in recesses of the first patterns;
forming a second material layer made of any one of the magnetic material and the non-magnetic material on a circumferential surface of the cylinder main body having the first functional patterns formed thereon;
a second pattern forming step of forming second patterns having second recess patterns and second non-recess patterns, the second pattern forming step including applying a resist onto a surface of the second material layer, subjecting the resist to laser exposure, and subjecting the circumferential surface of the cylinder main body to corrosion; and
a second functional pattern part forming step of adjacently forming magnetic patterns of the magnetic material and non-magnetic patterns of the non-magnetic material by embedding second functional patterns made of any one of the magnetic material and the non-magnetic material in recesses of the second patterns.

14. A method of manufacturing a functional cylinder body according to claim 13, wherein one or more of the first functional patterns and the second functional patterns are formed in a linear shape and formed alternately in one or more of a radial direction and an axial direction of the cylinder main body.

15. A method of manufacturing a functional cylinder body according to claim 13, wherein the first functional patterns and the second functional patterns are formed in a linear shape and formed so as to be orthogonal to each other.

16. A method of manufacturing a functional cylinder body according to claim 13, wherein the recesses of the cylinder main body are manufactured by laser plate making.

17. A method of manufacturing a functional cylinder body according to claim 13, wherein the magnetic patterns are made of at least one kind of magnetic material comprising one of Fe, Ni, and Co.

18. A method of manufacturing a functional cylinder body according to claim 13, wherein the non-magnetic patterns are made of at least one kind of non-magnetic material comprising one of Cu and Al.

19. A method of manufacturing a functional cylinder body according to claim 13, wherein the magnetic patterns and the non-magnetic patterns are made of a metal material, and the method further comprises:
a metal plating step of forming the magnetic patterns and the non-magnetic patterns.

20. A method of manufacturing a functional cylinder body according to claim 13, wherein the method of manufacturing the functional cylinder body is performed by a fully automatic laser gravure plate-making system.

* * * * *